United States Patent [19]

Hösel

[11] Patent Number: 5,050,271
[45] Date of Patent: Sep. 24, 1991

[54] ROTATION AND STANDSTILL RESPONSIVE LOCKING DEVICE FOR AN ACCESS DOOR OF A TEXTILE MACHINE

[75] Inventor: Fritz Hösel, Mönchengladbach, Fed. Rep. of Germany

[73] Assignee: Trützschler GmbH & Co. KG, Mönchengladbach, Fed. Rep. of Germany

[21] Appl. No.: 509,752

[22] Filed: Apr. 17, 1990

[30] Foreign Application Priority Data

Apr. 19, 1989 [DE] Fed. Rep. of Germany ....... 3912737

[51] Int. Cl.⁵ .......................................... D01G 31/00
[52] U.S. Cl. ...................................................... 19/98
[58] Field of Search ..................... 192/116.5, 131, 132, 192/135, 133, 136, 129 A, 129 R; 49/31; 19/0.2, 0.21, 0.22, 98; 250/233; 364/431.03; 355/55

[56] References Cited

U.S. PATENT DOCUMENTS

| | | | |
|---|---|---|---|
| 2,843,239 | 7/1958 | Nelson | 192/136 |
| 3,058,563 | 10/1962 | Petre | 192/116.5 |
| 3,608,337 | 9/1971 | Redfern et al. | 192/136 X |
| 3,866,825 | 2/1975 | Balazer et al. | 192/136 X |
| 3,963,919 | 6/1976 | Sells | 250/233 X |
| 4,364,151 | 12/1982 | Beneke et al. | 19/0.2 |
| 4,418,950 | 12/1983 | Penhasi | |
| 4,446,602 | 5/1984 | Marx et al. | 19/0.21 |
| 4,611,703 | 9/1986 | Bliss | 192/133 X |
| 4,695,795 | 9/1987 | Nakamizo et al. | 324/207.15 |
| 4,700,305 | 10/1987 | Lotterbach et al. | 364/431.03 |
| 4,806,988 | 2/1989 | Verner | 355/55 |

FOREIGN PATENT DOCUMENTS

| | | |
|---|---|---|
| 2277046 | 3/1976 | Fed. Rep. of Germany . |
| 2928507 | 6/1982 | Fed. Rep. of Germany . |
| 3321261 | 10/1985 | Fed. Rep. of Germany . |
| 3733972 | 4/1989 | Fed. Rep. of Germany . |
| 2305745 | 10/1976 | France .............................. 192/129 A |
| 135233 | 4/1979 | German Democratic Rep. . |
| 1315581 | 5/1973 | United Kingdom . |
| 1384729 | 2/1975 | United Kingdom . |
| 2067295 | 7/1981 | United Kingdom . |
| 2144224 | 2/1985 | United Kingdom . |

OTHER PUBLICATIONS

Reinert "Der Deckel bleibt zu", Maschinenmarkt, No. 78, 1972, pp. 348-349.

Primary Examiner—Werner H. Schroeder
Assistant Examiner—John J. Calvert
Attorney, Agent, or Firm—Spencer & Frank

[57] ABSTRACT

A textile machine has a rotary part, an openable and closable cover having a closed position in which access to the rotary part is prevented and an open position in which access to the rotary part is allowed. There are further provided a lock having a bolted position in which the cover is locked in the closed position and an unbolted position in which the cover is allowed to be moved into the open position and a standstill monitor for sensing rotation and standstill of the rotary part. The standstill monitor is connected to the lock for placing the lock into the bolted or unbolted position. The standstill monitor comprises an incremental rotary sensor coupled to the rotary part and controlling the lock.

7 Claims, 3 Drawing Sheets

FIG. 2
FIG. 3
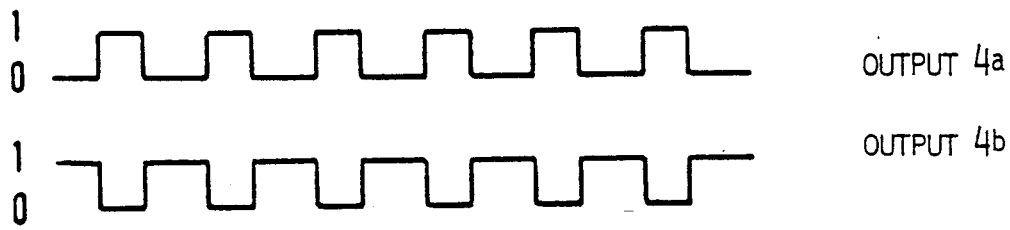
OUTPUT 4a
OUTPUT 4b
FIG. 4
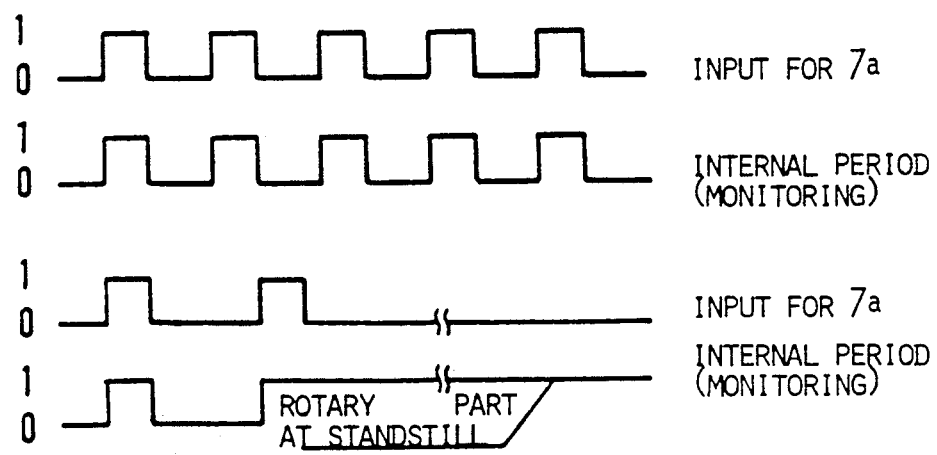
INPUT FOR 7a
INTERNAL PERIOD (MONITORING)
INPUT FOR 7a
INTERNAL PERIOD (MONITORING)
ROTARY PART AT STANDSTILL
FIG. 5
|  | RELAY 8a | RELAY 8b | STAND-STILL | ROTATION/DEFECT |
|---|---|---|---|---|
| PART ROTATES | DE-ENERG. | DE-ENERG. | NO | YES |
| PART IS STATIONARY | DE-ENERG. | ENERG. | YES | NO |
|  | ENERG. | DE-ENERG. | YES | NO |
| DEFECT | ENERG. | ENERG. | NO | YES |

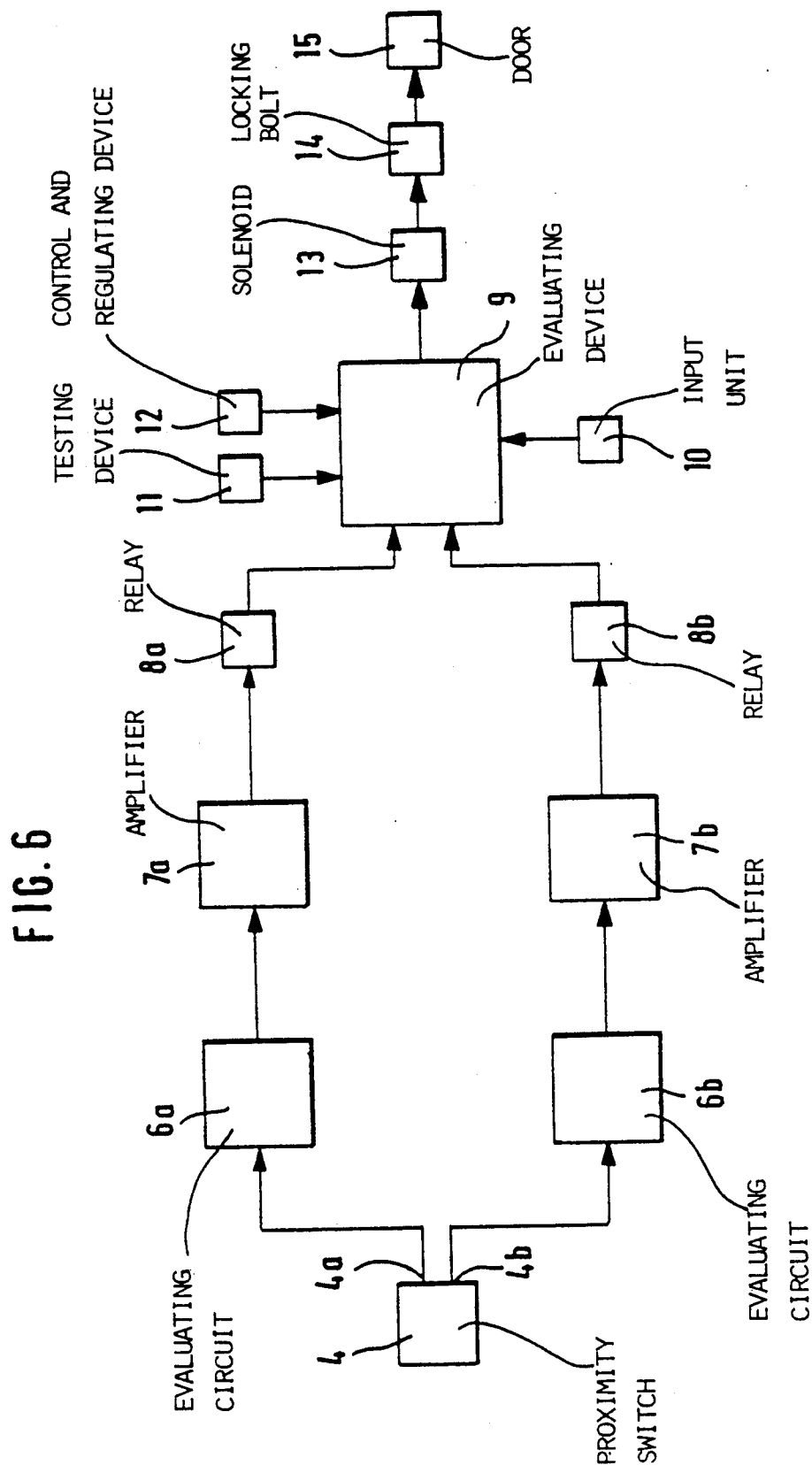

ROTATION AND STANDSTILL RESPONSIVE LOCKING DEVICE FOR AN ACCESS DOOR OF A TEXTILE MACHINE

BACKGROUND OF THE INVENTION

This invention relates to an apparatus for locking the openable parts of protective covers in textile machines, particularly machines for the spinning preparation such as carding machines, roller card units, bale openers, cleaners, fine openers and the like which have rotary components such as shafts, drums, cylinders, rollers and the like. Conventionally, such apparatus includes devices which monitor the standstill of the rotary components and actuating members which are controlled by the standstill monitors and which effect a locking or an unlocking of the movable cover parts.

In textile machines of the above type, rotary cylinders are present which represent a significant safety hazard for the operating personnel. For this reason such cylinders are, as a rule, covered by doors or other devices which prevent inadvertent touching. Since such rotary components, because of their large mass, have an inertia run of several minutes after power switch-off and which have to be routinely serviced by maintenance work, the need arises to monitor their rotation and permit an opening of the doors or other covering devices only after such rotary components are at a standstill to thus prevent access to the components when the protective covering is not in place and the component may still rotate.

In a known apparatus of the above-outlined type a tachogenerator is used as the standstill monitor which is coupled with the shaft of the main cylinder of a carding machine. The tachogenerator is connected to a circuit by a voltage measuring relay; the circuit controls the locking and unlocking of the protective cover. During operation, the tachogenerator delivers current as long as the carding cylinder rotates. Upon standstill of the carding cylinder the locking device is released so that the protective cover may be opened. It may occur, however, that a defect in some components, for example, a wire breakage, causes a false indication of "cylinder stopped" instead of "cylinder rotates". Thus, in case of such a defect, even if the cylinder is still rotating, the current from the tachogenerator is not transmitted, as a result of which the protective cover will be prematurely unlocked, thus significantly increasing the risks of accidents. Furthermore, the above-outlined conventional apparatus is relatively complex.

SUMMARY OF THE INVENTION

It is an object of the invention to provide an improved apparatus of the above-outlined type from which the discussed disadvantages are eliminated and which is of simple construction and is characterized by an increased reliability against undesired, premature opening of machine covers.

This object and others to become apparent as the specification progresses, are accomplished by the invention, according to which, briefly stated, the standstill monitor of the rotary machine components includes a rotary sensor/transmitter for controlling the locking and unlocking device and normally emitting a signal representing rotation of the rotary part. A circuit prevents the locking device from being placed in the unbolted position in an absence of the signal during rotation of the rotary part.

According to an advantageous feature of the invention, the rotation sensor comprises a stationary sensor and a rotary part attached to the rotating component.

The apparatus according to the invention is advantageously integrated in the control system of the textile machine such that the rotary component may be energized only if first a successful "test" has been carried out. The particular advantages of the apparatus reside in that by integration with the other machine control components, particular functions may be performed which are directly connected with the servicing and maintenance of the machine. Thus, the monitoring device according to the invention may be integrated into the entire safety system of the textile machine.

BRIEF DESCRIPTION OF THE DRAWING

FIG. 2 is a diagram of a signal at an output of a rotation sensor according to the invention.

FIG. 3 is a diagram of signals at two exclusive OR outputs of a proximity sensor.

FIG. 4 is a diagram of input signals at two evaluating circuits.

FIG. 5 shows a signal logic table.

FIG. 6 is a block diagram of the apparatus according to the invention.

DESCRIPTION OF THE PREFERRED EMBODIMENTS

Figure 1A:
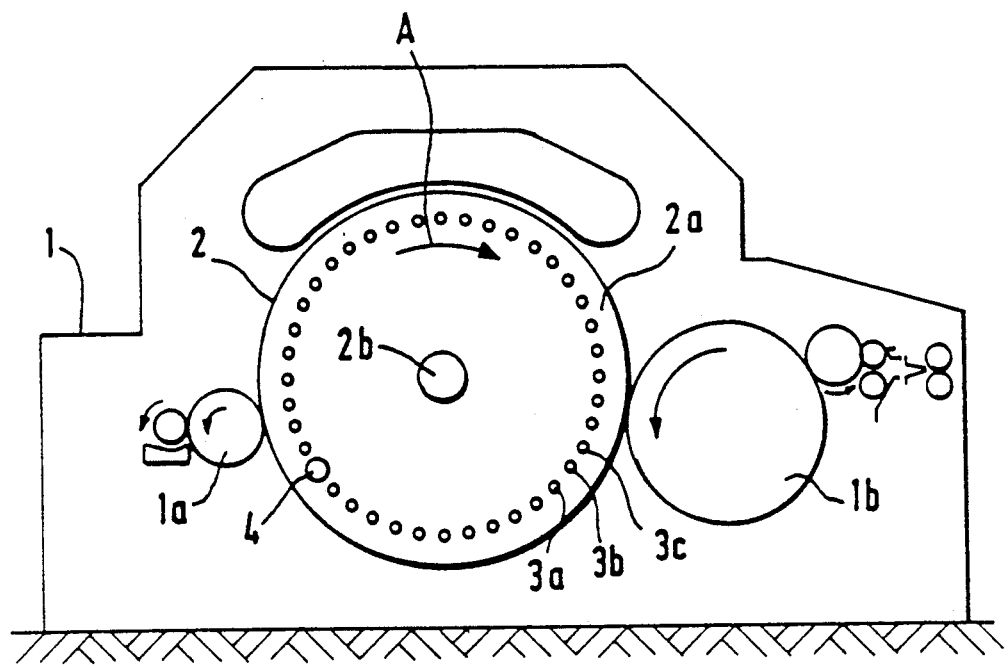
FIG. 1a is a schematic side elevational view of a carding machine incorporating a preferred embodiment of the invention.
Figure 1B:
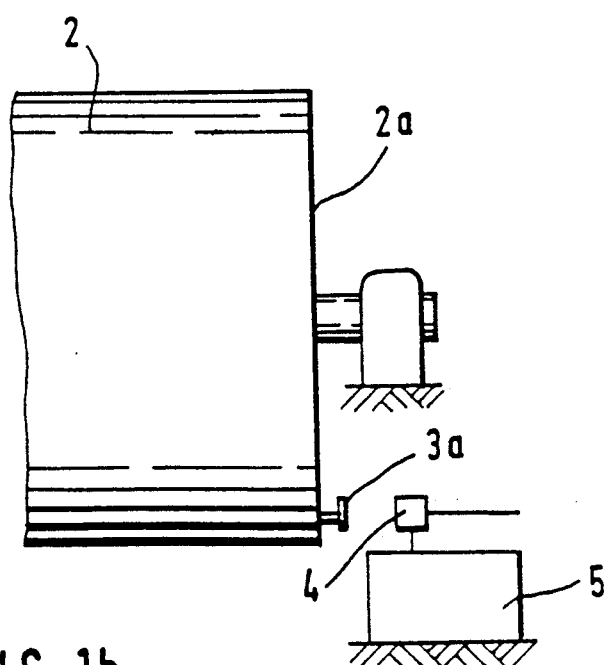
FIG. 1b is a schematic end elevational view of one part of the construction shown in FIG. 1a, illustrating the preferred embodiment in more detail.

Turning to FIG. 1, there is schematically shown a known carding machine 1 which may be, for example, an EXACTACARD DK 740 Model, manufactured by Trützschler GmbH & Co. KG, Mönchengladbach, Federal Republic of Germany.

The main carding cylinder 2 of the carding machine has a radial end face 2a to which a plurality of screws 3a ... 3n are secured in a circular array which is concentric with the cylinder axis. An inductive proximity switch 4 is arranged stationarily on a lateral fixed component 5 of the carding machine 1 in such a manner that as the carding cylinder 2 rotates, the screws 3a ... 3n sequentially move into and out of alignment with the sensor 4. Thus, the sensor 4 is cyclically actuated by the screws 3a ... 3n upon rotation of the carding cylinder 2.

The incremental rotation sensor formed of screws 3a ... 3n and the stationary proximity switch 4 may also be associated with another rotary member of the carding machine, for example, with the licker-in 1a, the doffer 1b or a shaft such as the carding cylinder shaft 2b. The screws 3a ... 3n may be replaced by the teeth of a gear attached concentrically to the radial end face 2a of the carding cylinder 2. Instead of an inductive sensor, it is feasible to use a concentric, radially slotted disc as the rotary member and a photocell or optical barrier as the stationary sensor.

The square tooth-shaped output signal of the proximity switch 4 is illustrated in FIG. 2.

Turning to FIG. 6, the proximity switch 4 has two opposite polarity outputs 4a and 4b which, for performing the unlocking and locking functions, deliver signals as illustrated in FIG. 3. The signals are applied to two evaluating circuits 6a, 6b which emit a respective output signal (shown in FIG. 4) only if the input signal persists without interruption for a predetermined period (for example, for a duration of ten seconds).

The output signals of the evaluating circuits 6a, 6b are applied, with the intermediary of respective signal amplifiers 7a, 7b, to respective relays 8a, 8b for energizing the same upon receipt of such signal. The contacts of the relays 8a, 8b supply information whether the cylinder 2 rotates or whether it is stationary or whether a defect is present in the system. The signal logic is shown in the table illustrated in FIG. 5. Thus, if the cylinder 2 is at a standstill, the solenoid 13 is de-energized to unlock the bolt 14 for the doors 15.

In the FIG. 6 arrangement the sensor 4 is part of an integrated safety apparatus. The relays 8a and 8b apply output signals to a common evaluating device 9 to which there are also applied signals from an input unit 10, from a device 12 for machine information obtained from the machine and test functions obtained from a testing device 11. The evaluating device 9 applies signals to the magnets 13 associated with a locking device 14 for the doors 15.

A control and regulating device for the carding machine 1 to which the apparatus according to the invention is connected, may be a microcomputer TMS manufactured by Trützschler & Co. KG and may be combined with a Rockwell 6502 microprocessor.

Thus, by virtue of the control circuit which is illustrated in FIG. 6 and which processes the signals emitted by the incremental sensor 4, contrary to known devices, a defect in a component such as a breakage in the wire, a loose contact or the like always results in an erroneous indication that the "cylinder is rotating" rather than "cylinder at a standstill". Even if in case of wire breakage (or the like) no current flows, the sensor reports a rotation of the cylinder, thus preventing the cover from being opened.

It will be understood that the above description of the present invention is susceptible to various modifications, changes and adaptations, and the same are intended to be comprehended within the meaning and range of equivalents of the appended claims.

What is claimed is:

1. In a textile machine having a rotary part, an openable and closable cover having a closed position in which access to the rotary part is prevented and an open position in which access to the rotary part is allowed; locking means cooperating with said cover and having a bolted position in which said cover is locked in the closed position and an unbolted position in which said cover is allowed to be moved into said open position; standstill monitoring means for sensing rotation and standstill of said rotary part; said standstill monitoring means being operatively connected to said locking means for placing the locking means into said bolted or unbolted position; the improvement wherein said standstill monitoring means comprises a rotary sensor coupled to said rotary part and being arranged to control said locking means and normally emitting a signal representing rotation of said rotary part; and means for preventing the locking means from being placed in the unbolted position in an absence of said signal during rotation of said rotary part.

2. A textile machine as defined in claim 1, wherein said rotary sensor comprises a rotary component rotated by said rotary part and a stationary sensor operatively connected to said rotary component for emitting signals as a function of the rotation of said rotary part.

3. A textile machine as defined in claim 2, wherein said rotary component is affixed to said rotary part to rotate therewith as a unit.

4. A textile machine as defined in claim 2, wherein said rotary component comprises a plurality of metal elements affixed to said rotary part in a circular array generally concentrically with an axis of rotation of said rotary part and said stationary sensor comprises an inductive proximity switch.

5. In a textile machine having a rotary part, an openable and closable cover having a closed position in which access to the rotary part is prevented and an open position in which access to the rotary part is allowed; locking means cooperating with said cover and having a bolted position in which said cover is locked in the closed position and an unbolted position in which said cover is allowed to be moved into said open position; standstill monitoring means for sensing rotation and standstill of said rotary part; said standstill monitoring means being operatively connected to said locking means for placing the locking means into said bolted or unbolted position; the improvement wherein said standstill monitoring means comprises
    (a) rotary sensor coupled to said rotary part and being arranged to control said locking means; said rotary sensor having two opposite polarity outputs; and
    (b) two evaluating circuits connected to respective said outputs of said rotary sensor; each said evaluating circuit having an output on which an output signal appears only when a signal applied by the opposite polarity outputs to the evaluating circuits is continuously maintained for a predetermined period.

6. A textile machine as defined in claim 5, further comprising two relays connected to respective said outputs of respective said evaluating circuits.

7. A textile machine as defined in claim 6, further comprising an evaluating device having inputs connected to respective said relays; a solenoid having an input connected to an output of said evaluating device; said solenoid being operatively connected to said locking means.

* * * * *